(12) United States Patent
Okuno et al.

(10) Patent No.: US 11,288,099 B2
(45) Date of Patent: Mar. 29, 2022

(54) ELECTRONIC APPARATUS, STORAGE MEDIUM STORING COMPUTER PROGRAM, AND METHOD OF PERFORMING SETTINGS OF ELECTRONIC APPARATUS

(71) Applicant: BROTHER KOGYO KABUSHIKI KAISHA, Nagoya (JP)

(72) Inventors: Tetsuya Okuno, Nagoya (JP); Katsunori Enomoto, Toyokawa (JP); Fumitake Tajiri, Nagoya (JP); Yoshihiro Itogawa, Mizuho (JP); Sho Ogura, Nagoya (JP); Hideki Nogawa, Nagoya (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 8 days.

(21) Appl. No.: 15/791,543

(22) Filed: Oct. 24, 2017

(65) Prior Publication Data
US 2018/0129538 A1 May 10, 2018

(30) Foreign Application Priority Data
Nov. 10, 2016 (JP) .............................. JP2016-219645

(51) Int. Cl.
*G06F 15/16* (2006.01)
*G06F 9/50* (2006.01)
(Continued)

(52) U.S. Cl.
CPC ......... *G06F 9/5038* (2013.01); *G03G 15/502* (2013.01); *G03G 15/5066* (2013.01);
(Continued)

(58) Field of Classification Search
CPC .... G06F 9/5038; G06F 3/1257; G06F 3/1285; G03G 15/502; G03G 15/5066; G03G 2215/00092; H04N 1/00965; G06Q 10/06
See application file for complete search history.

(56) References Cited

U.S. PATENT DOCUMENTS

2006/0259549 A1* 11/2006 Huang ................... G06F 3/1229
709/203
2007/0229897 A1* 10/2007 Kato ................... G03G 15/5066
358/1.16
(Continued)

FOREIGN PATENT DOCUMENTS

| JP | 2007274460 A | 10/2007 |
|---|---|---|
| JP | 2013020326 A | 1/2013 |

*Primary Examiner* — Hua Fan
(74) *Attorney, Agent, or Firm* — Scully, Scott, Murphy & Presser, P.C.

(57) ABSTRACT

An electronic apparatus performs: acquiring an input file name from a removable memory connected to an interface; determining whether the input file name includes a first character string and whether the input file name includes a second character string; when the input file name includes the first character string, changing current setting information into specified setting information, the current setting information being among a plurality of setting information stored in the internal memory and corresponding to a first setting item specified by first input information, the specified setting information being included in the first input information and corresponding to the first setting item; and when the input file name includes the second character string, acquiring current setting information corresponding to a second setting item specified by second input information; and storing, in the removable memory, a file including output information indicating the acquired current setting information, as an output file.

23 Claims, 10 Drawing Sheets

(51) Int. Cl.
*G06F 3/12* (2006.01)
*G03G 15/00* (2006.01)
*H04N 1/00* (2006.01)
*G06Q 10/06* (2012.01)

(52) U.S. Cl.
CPC .......... *G06F 3/1204* (2013.01); *G06F 3/1257* (2013.01); *G06F 3/1285* (2013.01); *H04N 1/00965* (2013.01); *G03G 2215/00092* (2013.01); *G06Q 10/06* (2013.01)

(56) References Cited

U.S. PATENT DOCUMENTS

| | | | |
|---|---|---|---|
| 2011/0230182 A1* | 9/2011 | Stump | H04Q 9/00 455/423 |
| 2012/0221689 A1* | 8/2012 | Qian | H04L 67/34 709/220 |
| 2013/0013662 A1 | 1/2013 | Masuda | |
| 2016/0034488 A1* | 2/2016 | Schillinger | H04L 67/34 707/693 |

* cited by examiner

CHANGE INPUT FILE IFS

FIG. 2A

MAIN INPUT FILE                                                         MFS

FILE NAME: SETTING_SAMPLE_COMPREHENSIVE-SETTING.json

```
{
    "display_language"     : "English",
    "sleep_transition_time" : 30,
    "logo_image"           : "logo1.png",
    "shortcut_setting"     : "shortcut.xml",
}
```

FIG. 2B

SUBSIDIARY FILE

FILE NAME: logo1.png

 ~LIa

FILE NAME: shortcut.xml                                 SCF

```
<shortcut_list>
 <shortcut>
   <number> 1 </number>
   <name> shortcut1 </name>
   <application>
    <scan>
      <transmission_destination> abc@xxx.com </transmission_destination>
      <resolution> 600 </resolution>
    </scan>
   </application>
 </shortcut>
 ...
</shortcut_list>
```

FIG. 3

ACQUISITION INPUT FILE IFG

FILE NAME: ACQUISITION_SAMPLE_COMPREHENSIVE-SETTING.json

```
{
    "display_language"      : "",
    "sleep_transition_time" : 0,
    "logo_image"            : "",
}
```
~IFG

OUTPUT FILE OF SETTING
INFORMATION CHANGE PROCESS

FIG. 6A

STATUS FILE (IN THE CASE OF SUCCESS)

FILE NAME: OK_SAMPLE_MODEL100_NO12345_001.txt  SFa

NORMAL_COMPLETION

FIG. 6B

STATUS FILE (IN THE CASE OF FAILURE)

FILE NAME: NG_SAMPLE_MODEL100_NO12345_001.txt  SFb

JSON_Value_ABNORMAL

OUTPUT FILE OF SETTING
INFORMATION ACQUISITION PROCESS

FIG. 8A

SETTING INFORMATION FILE SIF (A1) MAIN SETTING INFORMATION FILE

FILE NAME: SAMPLE_MODEL100_NO12345_002.json   MIF

```
{
  "display_language"      : "Japanese",
  "sleep_transition_time" : 20,
  "logo_image"            : "logo2.png",
}
```

(A2) SUBSIDIARY FILE

FILE NAME: logo2.png

LIb

FIG. 8B

STATUS FILE (IN THE CASE OF SUCCESS)

FILE NAME: OK_SAMPLE_MODEL100_NO12345_002.txt   SFc

NORMAL_COMPLETION

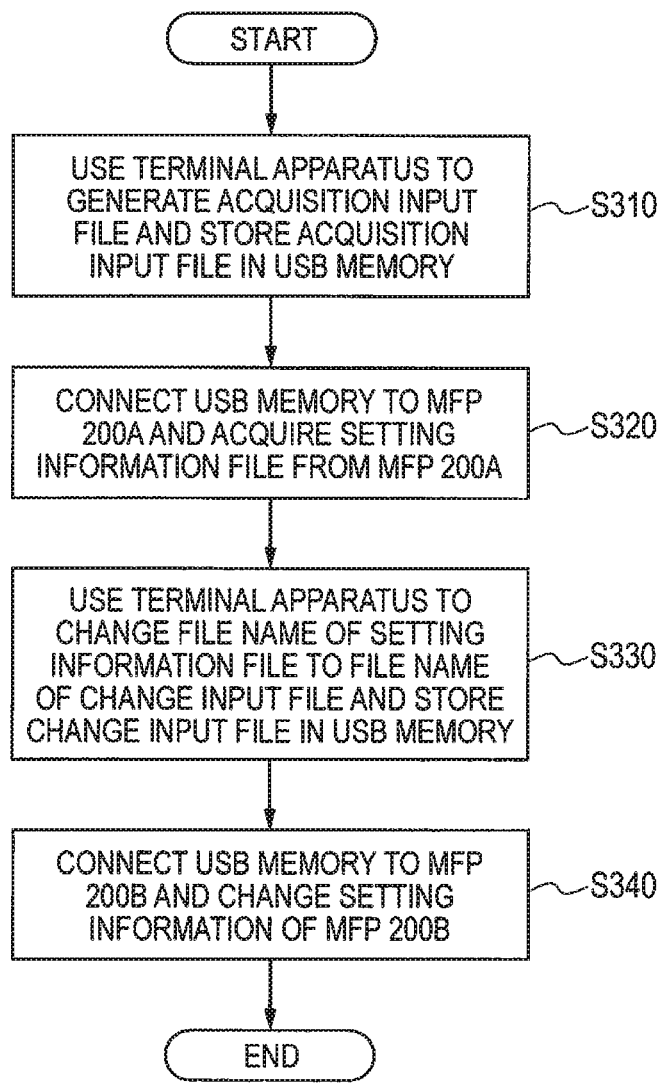

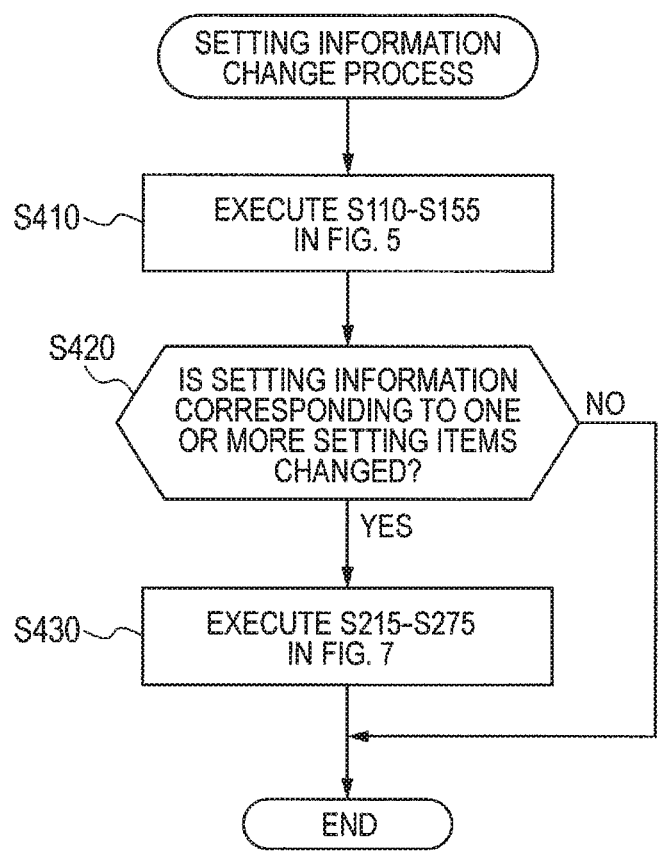

ELECTRONIC APPARATUS, STORAGE MEDIUM STORING COMPUTER PROGRAM, AND METHOD OF PERFORMING SETTINGS OF ELECTRONIC APPARATUS

CROSS REFERENCE TO RELATED APPLICATIONS

This application claims priority from Japanese Patent Application No. 2016-219645 filed on Nov. 10, 2016. The entire content of the priority application is incorporated herein by reference.

TECHNICAL FIELD

This specification relates to technology for setting an electronic apparatus to which a removable memory can be connected.

BACKGROUND

When a removable memory in which a setting file is stored is connected to an MFP, the MFP reads the setting file. The MFP uses the setting file to make settings for the MFP.

SUMMARY

According to one aspect, this specification discloses an electronic apparatus. The electronic apparatus includes an interface, a processor, and an internal memory. The interface is configured to be connected to a removable memory storing an input file having an input file name. The input file includes first input information when the input file name includes a first character string. The input file includes second input information when the input file name includes a second character string. The internal memory stores a plurality of setting information relating to the electronic apparatus. The internal memory stores instructions, the instructions, when executed by the processor, causing the processor to perform: acquiring the input file name from the removable memory connected to the interface; determining whether the input file name includes the first character string and whether the input file name includes the second character string; when the input file name includes the first character string, changing current setting information into specified setting information, the current setting information being among the plurality of setting information stored in the internal memory and corresponding to a first setting item specified by the first input information, the specified setting information being included in the first input information stored in the removable memory and corresponding to the first setting item; and when the input file name includes the second character string, acquiring, from the internal memory, current setting information corresponding to a second setting item specified by the second input information; and storing, in the removable memory, a file including output information indicative of the acquired current setting information, as an output file.

According to another aspect, this specification also discloses a non-transitory computer-readable storage medium storing a set of program instructions executable on an electronic apparatus. The set of program instructions includes: acquiring an input file name of an input file stored in a removable memory connected to an interface of the electronic apparatus, the electronic apparatus having an internal memory storing a plurality of setting information relating to the electronic apparatus, the input file including first input information when the input file name includes a first character string, the input file including second input information when the input file name includes a second character string; determining whether the input file name includes the first character string and whether the input file name includes the second character string; when the input file name includes the first character string, changing current setting information into specified setting information, the current setting information being among the plurality of setting information stored in the internal memory and corresponding to a first setting item specified by the first input information, the specified setting information being included in the first input information stored in the removable memory and corresponding to the first setting item; and when the input file name includes the second character string, acquiring, from the internal memory, current setting information corresponding to a second setting item specified by the second input information; and storing, in the removable memory, a file including output information indicative of the acquired current setting information, as an output file.

According to still another aspect, this specification also discloses a method of performing settings of an electronic apparatus. The method includes: acquiring an input file name of an input file stored in a removable memory connected to an interface of the electronic apparatus, the electronic apparatus having an internal memory storing a plurality of setting information relating to the electronic apparatus, the input file including first input information when the input file name includes a first character string, the input file including second input information when the input file name includes a second character string; determining whether the input file name includes the first character string and whether the input file name includes the second character string; when the input file name includes the first character string, changing current setting information into specified setting information, the current setting information being among the plurality of setting information stored in the internal memory and corresponding to a first setting item specified by the first input information, the specified setting information being included in the first input information stored in the removable memory and corresponding to the first setting item; and when the input file name includes the second character string, acquiring, from the internal memory, current setting information corresponding to a second setting item specified by the second input information; and storing, in the removable memory, a file including output information indicative of the acquired current setting information, as an output file.

The technology disclosed in this specification can be realized by various other modes and, for example, can be realized by an image processing apparatus, a method for realizing functions of the electronic apparatus and the image processing apparatus, a computer program, a storage medium storing the computer program, and so on.

BRIEF DESCRIPTION OF THE DRAWINGS

Embodiments in accordance with this disclosure will be described in detail with reference to the following figures wherein:

FIGS. 2A and 2B are diagrams showing an example of a change input file IFS;

FIG. 3 is a diagram showing an example of an acquisition input file IFG;

FIGS. 6A and 6B are diagrams showing an example of output files of the setting information change process;

FIGS. 8A and 8B are diagrams showing an example of output files of the setting information acquisition process;

FIG. 9 is a flowchart showing an example in which setting information in the MFP 200A is copied to the MFP 200B; and FIG. 10 is a flowchart of a setting information change process according to a modification.

DETAILED DESCRIPTION

In the technology described above, however, consideration is given only to making settings, and no consideration is given to other types of processes related to the settings. Hence, it cannot be said that convenience on the settings of the MFP is sufficient. Such a problem is not limited to MFPs but has been a common problem to electronic apparatuses as a whole.

In view of the foregoing, this specification discloses technology which enhances convenience on the settings of electronic apparatuses by using a removable memory.

An aspect of this disclosure will be described while referring to the accompanying drawings.

A. Embodiments

Figure 1:
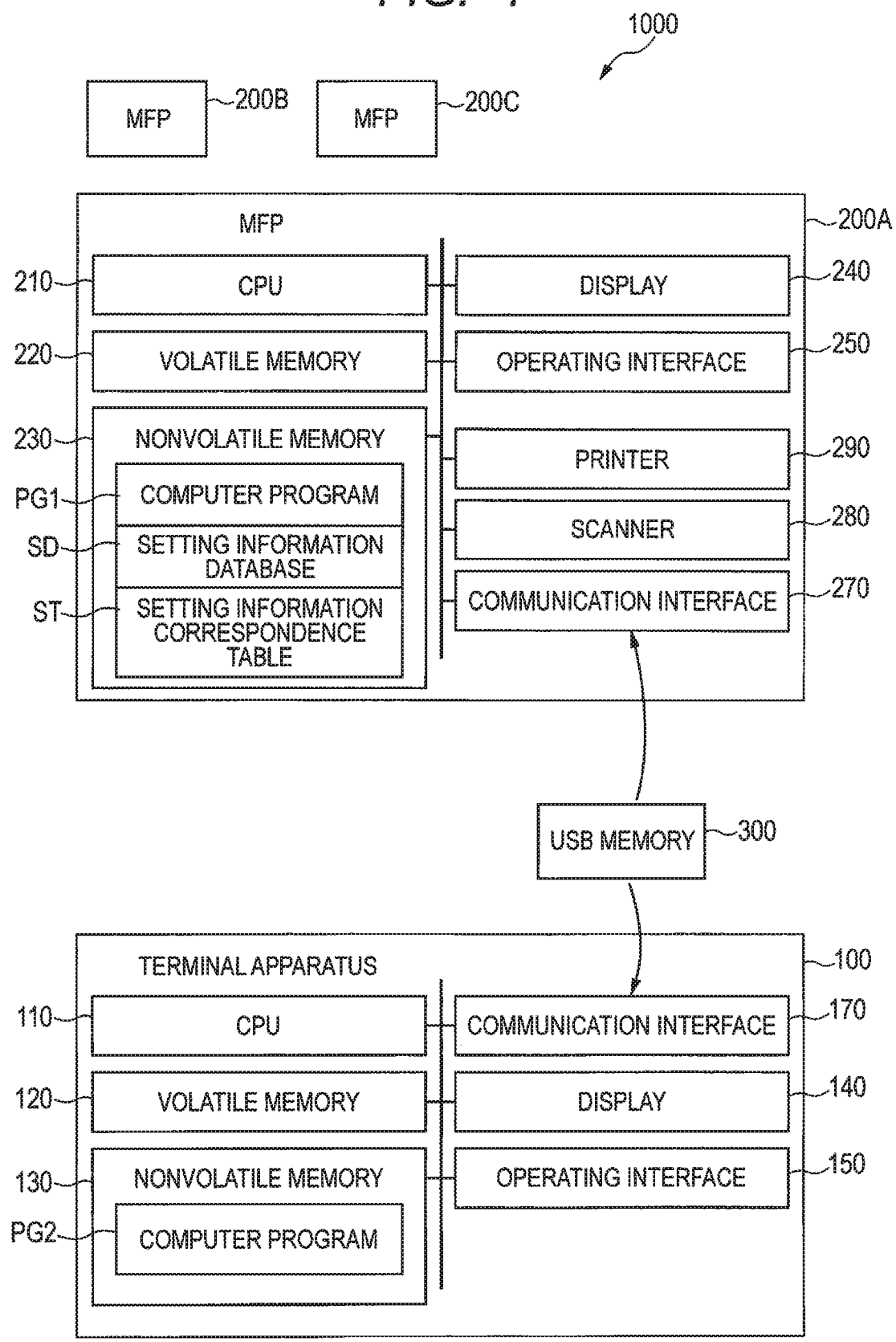
FIG. 1 is a block diagram of a system 1000 which includes MFPs 200A to 200C and a terminal apparatus 100.

A-1. Configuration of System Including Electronic Apparatus:

As shown in FIG. 1, an MFP 200A includes a CPU 210 which serves as the controller of the MFP 200A, a volatile memory 220 such as a RAM, a nonvolatile memory 230 such as a hard disc drive and a flash memory, a display 240 such as a liquid crystal display, an operating interface 250 such as a touch panel superimposed on a liquid crystal panel and buttons, a communication interface (IF) 270, a scanner 280, and a printer 290.

The scanner 280 uses photoelectric conversion elements such as CCD and CMOS so as to optically read a target such as a document, and thereby generates scan data indicating the read image. The printer 290 is a device which uses a particular method (for example, a laser method or an inkjet method) so as to print an image on a sheet (an example of a print medium).

The volatile memory 220 provides a buffer region in which various types of intermediate data generated when the CPU 210 performs processing are temporarily stored. In the nonvolatile memory 230, a computer program PG1, a setting information data base SD and a setting information correspondence table ST are stored. The volatile memory 220 and the nonvolatile memory 230 are the internal memories of the MFP 200A.

The computer program PG1 can be provided by being preliminarily stored in the nonvolatile memory 230 when the MFP 200A is manufactured. Instead of this, for example, the computer program PG1 can be provided by being downloaded from a server connected thereto through the Internet or by being recorded in a CD-ROM or the like.

The CPU 210 executes the computer program PG1 to control the MFP 200A. For example, the CPU 210 performs image processing such as a printing process and a reading process according to an instruction of a user. The printing process is processing in which an image is printed by the printer 290. The reading process is processing in which the target is optically read by the scanner 280 and in which the scan data is generated. The CPU 210 performs a setting related process (the details of which will be described later) in which setting information in the MFP 200A is changed or acquired.

In the setting information data base SD, a plurality of setting information which correspond to a plurality of setting items on the MFP 200A is stored. A plurality of the setting items includes, for example, setting items on the printer 290, setting items on the scanner 280, setting items on the display 240, and setting items on the power supply of the MFP 200A. Specific examples of the setting items will be described later. Identifiers (also referred to as item IDs) for identifying setting items are respectively allocated to a plurality of the setting items. In the setting information data base SD, the plurality of setting information and the item IDs of the corresponding setting items are stored in association with each other.

The setting information correspondence table ST is a table in which, for each of the setting items described above, setting item names (hereinafter also referred to as item names) and the item IDs of the setting items indicated by the item names are recorded so as to correspond to each other. In other words, by referring to the setting information correspondence table ST, the item ID corresponding to the setting item name can be acquired.

The communication interface 270 is an interface for performing data communication with an external device. The communication interface 270 includes a USB interface for performing data communication according to the USB (Universal Serial Bus) standard. Hence, a USB memory 300 serving as the removable memory can be connected to the communication interface 270, and the CPU 210 can access the USB memory 300 through the communication interface 270.

The configurations of the other MFPs 200B and 200C are the same as the configuration of the MFP 200A described above.

The terminal apparatus 100 is a computer which is used by the user of the MFPs 200A to 200C, and is, for example, a personal computer or a smartphone. The terminal apparatus 100 includes a CPU 110 which severs as the controller of the terminal apparatus 100, a volatile memory 120 such as a RAM, a nonvolatile memory 130 such as a hard disc drive, a display 140 such as a liquid crystal display, an operating interface 150 such as a mouse or a keyboard, and a communication interface (IF) 170.

The volatile memory 120 provides a buffer region for the CPU 110. In the nonvolatile memory 130, a computer program PG2 is stored. The computer program PG2 is provided by the manufacturer of the MFP 200A such as by being downloaded from a server or being stored in a DVD-ROM or the like. The CPU 110 functions as an application which executes the computer program PG2 so as to generate an input file used in the setting related process described later.

The communication interface 170 is an interface for performing data communication with an external device. As with the communication interface 270, the communication interface 170 includes a USB interface, and thus the USB memory 300 serving as the removable memory can be connected to the communication interface 170. The CPU 110 can access the USB memory 300 through the communication interface 170.

A-2. Input File:

The setting related process described later is a process for changing and acquiring the setting information stored in the setting information data base SD. As the input file used in the setting related process, there are two types, that is, a change input file IFS which is used for the setting information change process described later and an acquisition input file IFG which is used for a setting information acquisition process.

As shown in FIG. 2A, the change input file IFS includes at least one change main input file MFS. The change input file IFS may be only one change main input file MFS or may include one change main input file MFS as well as one or more subsidiary files (described later). The file name of the change main input file MFS includes a character string "SETTING", an arbitrary character string (in the example of FIG. 2A, "SAMPLE"), a character string "COMPREHENSIVE-SETTING", and a filename extension ".json". In this file name, the "SETTING", the arbitrary character string, and the "COMPREHENSIVE-SETTING" are arranged in this order through under bars "_". The "COMPREHENSIVE-SETTING" is a character string which indicates an input file used in the setting related process. The "SETTING" is a character string which indicates a change input file IFS used for the setting information change process included in the setting related process. The arbitrary character string is a character string which can freely be determined by the user. The ".json" is a filename extension which indicates that change input information included in the change main input file MFS is described with a data description language called JSON (the abbreviation of JavaScript™ Object Notation).

The information (also referred to as the change input information) included in the change main input file MFS is described with the JSON. The change input information includes a combination (pair) of a setting item name and setting information corresponding to the setting item indicated by the setting item name. In FIG. 2A, "display_language", "sleep_transition_time", "logo_image" and "shortcut_setting" are setting item names. For example, the "display_language" indicates a setting item which specifies a language used in a user interface (UI) screen displayed on the display 240. The "English" is setting information which corresponds to the "display_language". The sleep_transition_time indicates a setting item which specifies the number of seconds in which the power supply of the MFP 200A is maintained in a normal standby state. When in the standby state, the specified number of seconds has elapsed without an operation instruction being inputted, the MFP 200A shifts from the standby state to a sleep state. The "30" is setting information which corresponds to the "sleep_transition_time". The "display_language" and the "English", and the "sleep_transition_time" and the "30" which form pairs through colons ":" are examples of the pair of the setting item name and the setting information described above.

When the setting information is image data or includes a large number of setting values, a subsidiary file including setting information is prepared, and in the change main input file MFS, the file name of the subsidiary file corresponds to the setting item name. For example, the "logo_Image" is a setting item which specifies an image indicating a logo which is inputted into a header or a footer of the image to be printed. The "logo1.png" is the file name of a subsidiary file which is setting information corresponding to the "logo_image". The subsidiary file whose file name is the "logo1.png" is an image file which indicates an image LIa (FIG. 2B) indicating a logo. The "shortcut_setting" is a setting item for storing a plurality of setting information as one group. One group includes, for example, a plurality of setting information corresponding to a plurality of setting items on specific image processing (for example, the printing process or the reading process). The "shortcut.xml" is the file name of a subsidiary file which is setting information corresponding to the "shortcut_setting". A subsidiary file SCF (FIG. 2B) whose file name is the "shortcut.xml" is a file in which a plurality of setting information to be stored as one group are described.

As shown in FIG. 3, the acquisition input file IFG is one file. The file name of the acquisition input file IFG includes a character string "ACQUISITION", an arbitrary character string (in the example of FIG. 3, "SAMPLE"), a character string "COMPREHENSIVE-SETTING", and a filename extension ".json". In the file name described above, the "ACQUISITION", the arbitrary character string, and the "COMPREHENSIVE-SETTING" are arranged in this order through under bars "_". As described above, the "COMPREHENSIVE-SETTING" is a character string which indicates an input file used in the setting related process. The "ACQUISITION" is a character string which indicates an acquisition input file IFG used for the setting information acquisition process included in the setting related process. As described above, the arbitrary character string is a character string which can freely be determined by the user. The ".json" is a filename extension which indicates that acquisition input information included in the acquisition input file IFG is described with the JSON.

As with the change input information, the information (also referred to as the acquisition input information) included in the acquisition input file IFG is described with the JSON. The acquisition input information includes a setting item name. In the example of FIG. 3, the acquisition input information includes, as the setting item names, the "display_language", the "sleep_transition_time", and the "logo_image". Unlike the change input information, the acquisition input information does not include the setting information. For example, in the example of FIG. 3, a portion which pairs with the setting item name of the "display_language" and so on through the colon ":" is set to a blank or zero. In a modification, as with the change input information (FIG. 2A), the acquisition input information may include the setting information. In this case, the setting information included in the acquisition input information is not used in the setting information acquisition process (FIG. 7) described later.

The change input file IFS of FIGS. 2A and 2B and the acquisition input file IFG of FIG. 3 are generated by using an input file generation function which is realized by the execution of the computer program PG2 with the CPU 110. For example, when a setting item corresponding to setting information to be changed, the setting information after the change and an instruction to generate the change input file IFS are inputted to the terminal apparatus 100, the input file generation function generates the change input file IFS. When a setting item corresponding to setting information to be acquired, and an instruction to generate the acquisition input file IFG are inputted to the terminal apparatus 100, the input file generation function generates the acquisition input file IFG.

When the change input file IFS includes a plurality of files which includes the change main input file MFS and the subsidiary file, the input file generation function compresses the files so as to generate one compressed input file. The input file generation function encrypts the acquisition input file IFG or the change input file IFS (the compressed input file when it is compressed) so as to generate the encrypted input file. The input file generation function stores the encrypted input file in the USB memory 300 connected to the communication interface 170. In the encryption of the input file, a known common key encryption method is used. A common key which is used for the encryption is previously stored in the nonvolatile memory 130 of the terminal apparatus 100 and in the nonvolatile memory 230 of the MFP 200A. In the compression of the input file, a known compression algorism is used so as to generate a compressed input file corresponding to a ZIP file format.

In the input information included in the input file, in particular, in the change input information included in the change input file IFS, information which needs to be kept secret as setting information, for example, personal information such as a password or a mail address may be included. In the present embodiment, the input file is encrypted, and thus the leakage of the information which needs to be kept secret can be suppressed.

The change input file IFS and the acquisition input file IFG can be generated, for example, in the terminal apparatus 100, by use of a general text edition program. Part or the whole of the encryption or compression of the input file can be omitted.

When the user wishes to change the setting information which is stored in the setting information database SD of the MFP 200A, the user utilizes the input file generation function so as to generate the change input file IFS. When the user wishes to acquire the setting information which is stored in the setting information database SD of the MFP 200A, the user utilizes the input file generation function so as to generate the acquisition input file IFG. The change input file IFS and the acquisition input file IFG which are generated are stored in the USB memory 300.

As is understood from the above description, when the input file used in the setting related process includes the "SETTING" in the file name, that is, when the input file used in the setting related process is the change input file IFS, the change input information is included (FIG. 2A) whereas when the "ACQUISITION" is included in the file name, that is, when the input file used in the setting related process is the acquisition input file IFG, the acquisition input information is included (FIG. 3).

Figure 4:
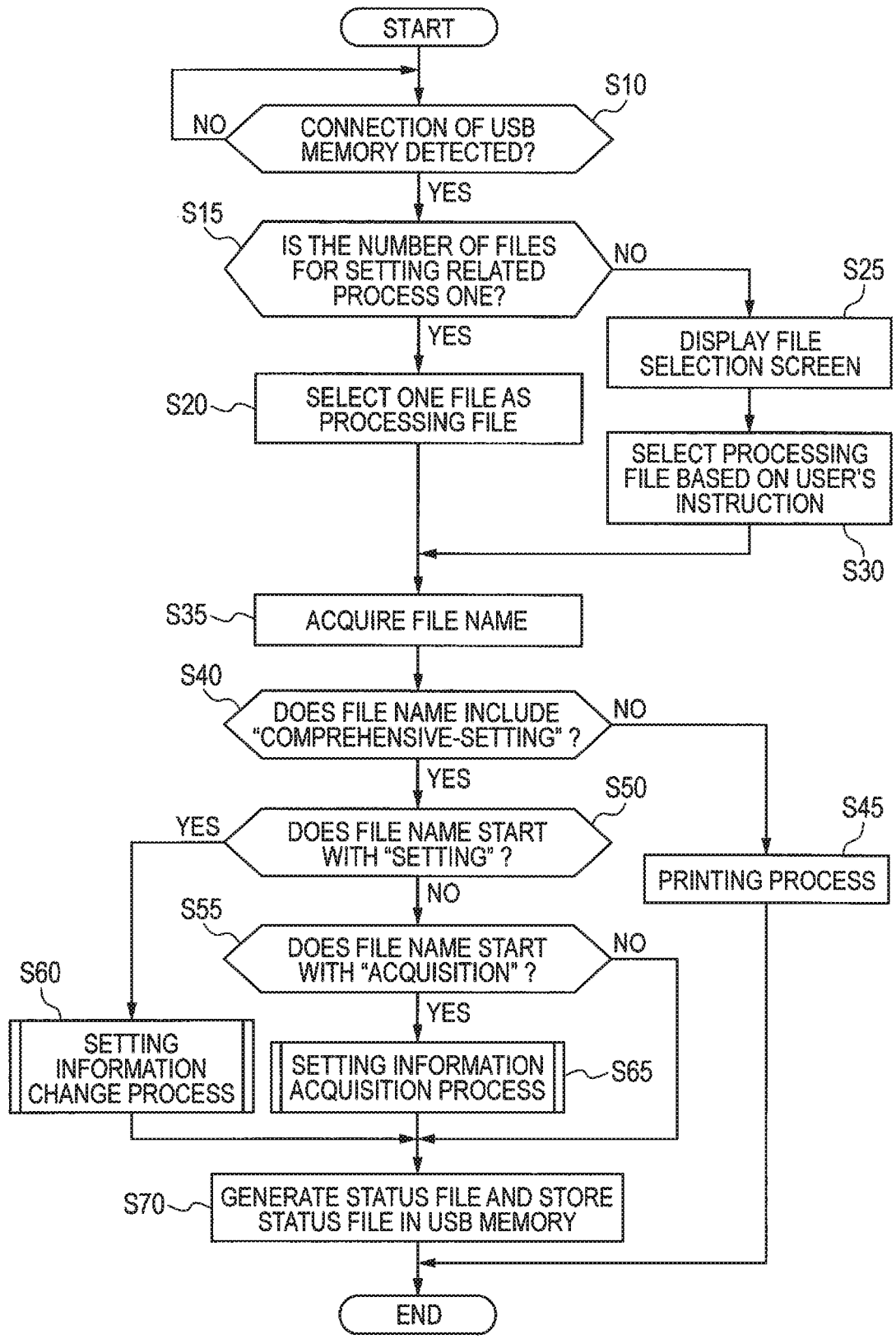
FIG. 4 is a flowchart of a setting related process.

A-3. Setting Related Process:

The setting related process shown in FIG. 4 is a process in which the setting information is changed or acquired according to the file name of the input file, that is, according to whether the input file is the change input file IFS or the acquisition input file IFG. The setting related process is performed by the CPUs of the MFPs 200A to 200C. Although in the following discussion, a case where the setting related process is performed by the CPU 210 of the MFP 200A will be described, the setting related process is likewise performed in the MFPs 200B and 200C.

While power supply is inputted to the MFP 200A, the communication interface 270 constantly monitors whether the USB memory 300 is connected to the communication interface 270. When the USB memory 300 is connected to the communication interface 270, the communication interface 270 notifies the CPU 210 about the connection of the USB memory 300, and the CPU 210 detects the connection of the USB memory 300.

In S10, the CPU 210 determines whether the connection of the USB memory 300 is detected. When the connection of the USB memory 300 is not detected (S10: NO), the CPU 210 stands by until the connection of the USB memory 300 is detected. When the connection of the USB memory 300 is detected (S10: YES), the CPU 210 moves the processing to S15. Here, it is assumed that the USB memory 300 stores not only the change input file IFS and the acquisition input file IFG described above but also the image file. This is because, as will be described later, the MFP 200A has the function of using the image file to perform printing when the USB memory 300 storing the image file is connected to the communication interface 270.

In S15, the CPU 210 determines whether among the files stored in the connected USB memory 300, the number of input files (specifically, the change input file IFS or the acquisition input file IFG) for the setting related process is one. In other words, the CPU 210 determines whether the number of files including the character string of the "COMPREHENSIVE-SETTING" in the file name is one. In a modification, it may be determined whether the number of files stored in the USB memory 300 is one, regardless of whether the target file is the input file for the setting related process.

When the number of input files for the setting related process is one (S15: YES), in S20, the CPU 210 selects the one input file for the setting related process as a target file to be processed (hereinafter also referred to as a processing file). When the number of input files for the setting related process is not one (S15: NO), the CPU 210 moves the processing to S25. The case where the number of input files for the setting related process is not one includes a case where no input file for the setting related process is included. For example, a case where only the image file is included in the USB memory 300 is included. The case where the number of input files for the setting related process is not one also includes a case where two or more input files for the setting related process are included.

In S25, the CPU 210 displays, on the display 240, a file selection screen which includes a list of all the files stored in the USB memory 300, and acquires, through the selection screen, a file selection instruction from the user. In S30, the CPU 210 selects, based on the file selection instruction from the user, one processing file from all the files stored in the USB memory 300. Consequently, based on the instruction from the user, an appropriate processing file can be selected.

In S35, the CPU 210 acquires the file name of the processing file. In S40, the CPU 210 determines whether the file name of the processing file include the character string of the "COMPREHENSIVE-SETTING". When the file name of the processing file does not include the "COMPREHENSIVE-SETTING" (S40: NO), the CPU 210 moves the processing to S45. In this case, the processing file is considered to be the image file which indicates an image to be printed. In S45, the CPU 210 uses the processing file to perform the printing process for printing the image indicated by the processing file, and ends the setting related process.

When the file name of the processing file includes the "COMPREHENSIVE-SETTING" (S40: YES), in S50, the CPU 210 determines whether the file name of the processing file includes the character string of the "SETTING". When the file name of the processing file does not include the "SETTING" (S50: NO), in S55, the CPU 210 determines whether the file name of the processing file includes the character string of the "ACQUISITION".

When the file name of the processing file includes the "SETTING" (S50: YES), the CPU 210 moves the processing to S60. In this case, the processing file is the change input file IFS. When the file name of the processing file includes the "ACQUISITION" (S55: YES), the CPU 210 moves the processing to S65. In this case, the processing file is the acquisition input file IFG. When the file name of the processing file includes neither the "SETTING" nor the "ACQUISITION" (S50: NO, S55: NO), the CPU 210 performs neither S60 nor S65 and moves the processing to S70. In this case, the file name is considered to be erroneous.

In S60, the CPU 210 uses the processing file (change input file IFS) to perform the setting information change process. Among a plurality of setting information included in the setting information database SD, the specified specific setting information is changed by the setting information change process as the details thereof will be described later.

In S65, the CPU 210 uses the processing file (acquisition input file IFG) to perform the setting information acquisition process. Among the plurality of setting information included in the setting information database SD, the specified specific setting information is acquired by the setting information acquisition process as the details thereof will be described later. A setting information file which includes the acquired setting information is stored as an output file in the USB memory 300 connected to the communication interface 270.

In S70, the CPU 210 generates a status file and stores the status file in the USB memory 300 connected to the communication interface 270. The CPU 210 may store, in the default directory of the USB memory 300 (for example, the highest directory), the status file or may newly generate a directory for the status file so as to store the status file in the new directory. For example, the directory for the status file is generated within the default directory as a subdirectory. Although the details thereof will be described later, when the setting information change process in S60 is performed, information indicating the result of the setting information change process is included in the status file. When the setting information acquisition process in S65 is performed, information indicating the result of the setting information acquisition process is included therein. When neither the setting information change process nor the setting information acquisition process is performed due to an error of the file name, information to that effect is included in the status file. When the generation and the storage of the status file are completed, the setting related process ends.

In the setting related process of the present embodiment, when the file name of the input file includes the "SETTING" (S50: YES), the setting information change process is performed (S60) whereas when the input file name includes the "ACQUISITION" (S55: YES), the setting information acquisition process is performed (S65). Consequently, the change of the setting information and the acquisition of the setting information can be easily realized by using the USB memory 300 as the removable memory. Hence, convenience on the settings of the MFPs 200A to 200C (an example of the electronic apparatus) can be enhanced. For example, even in an environment in which the terminal apparatus 100 of the user cannot communicate with the MFP 200A, for example, because the MFP 200A is not connected to a network, the change and the acquisition of the setting information stored in the MFP 200A can be easily performed.

Further, in the setting related process of the present embodiment, when the file name of the input file includes the "COMPREHENSIVE-SETTING" (S40: YES), it is determined whether the "SETTING" is included in the file name and whether the "ACQUISITION" is included therein (S50 and S55). Then, when the file name includes both the "COMPREHENSIVE-SETTING" (S40: YES) and the "SETTING" (S50: YES), the setting information change process is performed (S60). When the file name includes both the "COMPREHENSIVE-SETTING" (S40: YES) and the "ACQUISITION" (S55: YES), the setting information acquisition process is performed (S65). Further, when the input file name does not include the "COMPREHENSIVE-SETTING" (S40: NO), the input file is used to perform the printing process (S45). Hence, according to whether the file name of the input file includes the "COMPREHENSIVE-SETTING", changing or acquiring the setting information by using the input file and performing the printing process by using the input file can be appropriately switched.

Further, in the setting related process of the present embodiment, when it is detected that the USB memory 300 is connected to the communication interface 270 (S10: YES), the file name of the input file is automatically acquired without reception of an operation on the operating interface 250 by the user (S35), and whether the "SETTING" and the "ACQUISITION" are included in the file name is automatically determined without reception of an operation by the user (S50 and S55). Consequently, the setting information change process and the setting information acquisition process can proceed without reception of an operation by the user, and thus a burden on the user related to the setting of the MFP 200A can be suppressed.

A-4. Setting Information Change Process

Figure 5:
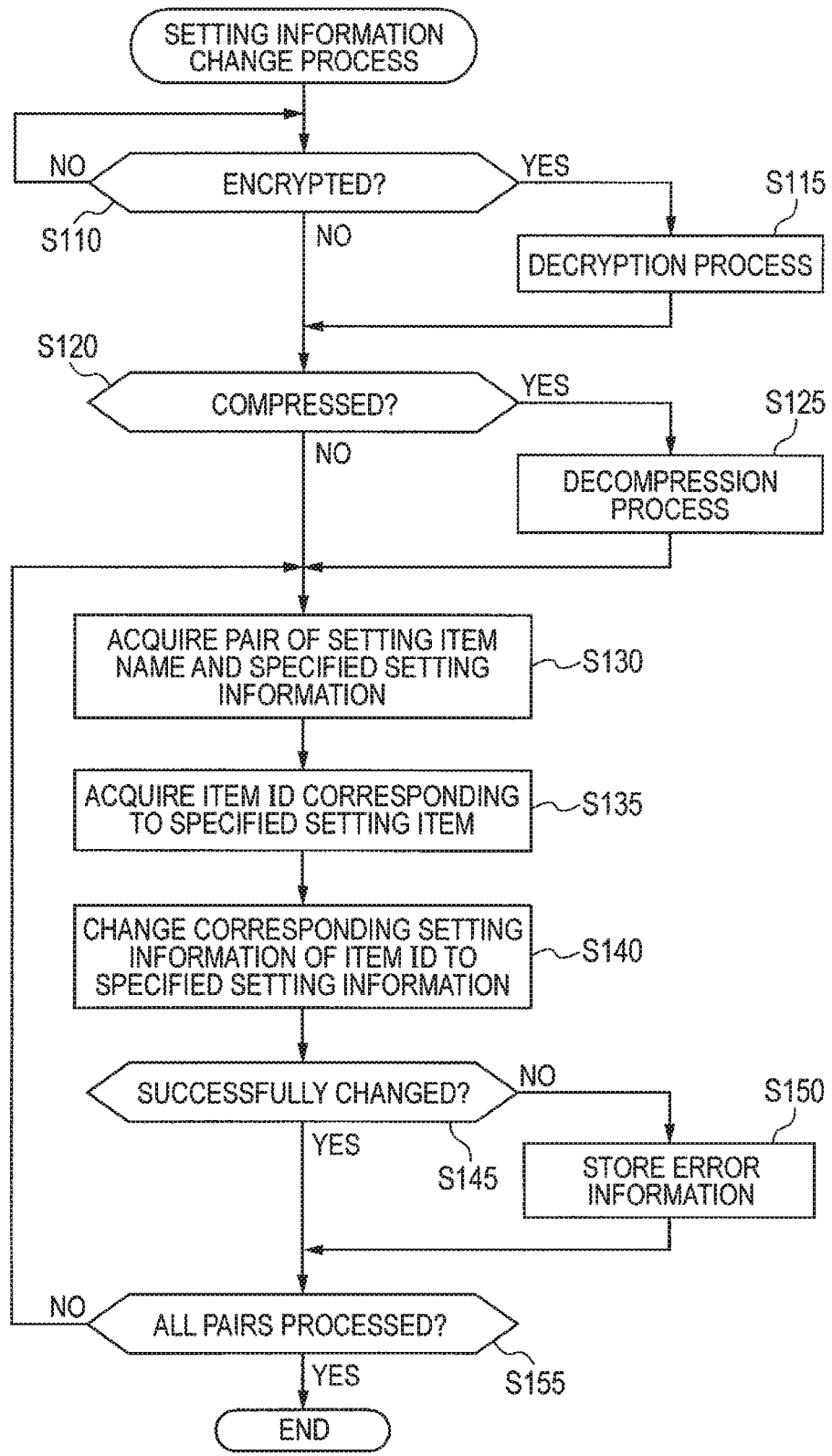
FIG. 5 is a flowchart of a setting information change process in S60 of FIG. 4.

FIG. 5 shows the setting information change process in S60 of FIG. 4. When the setting information change process is performed, the processing file is found to be the change input file IFS. In the setting information change process, among a plurality of setting information stored in the setting information database SD, setting information (hereinafter also referred to as "corresponding setting information" or "current setting information") corresponding to a setting item (hereinafter also referred to as "specified setting item") specified by the change input information included in the change input file IFS is changed to setting information (also referred to as "specified setting information") specified by the change input information.

In S110, the CPU 210 determines whether the change input file IFS is encrypted. When the change input file IFS is encrypted (S110: YES), in S115, the CPU 210 performs a decryption process in which the encrypted change input file IFS is decrypted. When the change input file IFS is not encrypted (S110: NO), the decryption process in S115 is skipped.

In S120, the CPU 210 determines whether the change input file IFS is compressed. When the change input file IFS is compressed (S120: YES), in S125, the CPU 210 performs a decompression process in which the compressed change input file IFS is decompressed (restored). When the change input file IFS is not compressed (S120: NO), the decompression process in S125 is skipped.

In S130, the CPU 210 acquires, from the change input information included in the change input file IFS (FIG. 2A), pairs of the setting item name and the specified setting information one at a time. In the example of FIG. 2A, for example, a pair of the "display_language" serving as the setting item name and the "English" serving as the specified setting information is first acquired. A pair of the "logo_image" serving as the setting item name and the subsidiary file "logo1.png" serving as the specified setting information is acquired in the third time.

In S135, the CPU 210 acquires an item ID corresponding to the specified setting item specified by the setting item name included in the acquired pair. The item ID is acquired by referring to the setting information correspondence table ST (FIG. 1).

In S140, the CPU 210 changes the corresponding setting information corresponding to the acquired item ID, among a plurality of setting information included in the setting information database SD, to the specified setting information included in the acquired pair. For example, when the pair acquired in S130 is a pair of the "display_language" and the "English", the current corresponding setting information corresponding to the item ID of the "display_language" is deleted from the setting information database SD, and the "English" is newly stored in the setting information database SD. When the pair acquired in S130 is a pair of the "logo_image" and the subsidiary file "logo1.png", the current corresponding setting information corresponding to the item ID of the "logo_image" is deleted, and the subsidiary file "logo1.png" is newly stored in the setting information database SD.

In S145, the CPU 210 determines whether the corresponding setting information is successfully changed. Here, a cause of a failure in the change of the corresponding setting information includes an abnormality in the setting item name, an abnormality in the specified setting information, and so on. The abnormality in the setting item name is a case where since the setting item name is erroneously typed, the corresponding item ID cannot be acquired in S135. The abnormality in the specified setting information is, for example, a case where the specified setting information is a value different from a value to be acquired (for example, a case where the specified setting information which needs to be a character string is a numerical value) or a case where the specified setting information is not present (for example, a case where no subsidiary file is present as the specified setting information).

When the change of the corresponding setting information is failed (S145: NO), in S150, the CPU 210 stores, in the volatile memory 220, error information indicating the cause of the error. The stored error information is recorded in the status file generated in S70 of FIG. 4 described previously. When the change of the corresponding setting information is successful (S145: YES), the processing in S150 is skipped.

In S155, the CPU 210 determines whether all the pairs included in the change input file IFS are processed. When an unprocessed pair is present (S155: NO), the CPU 210 returns to S130. When all the pairs are processed (S155: YES), the CPU 210 ends the setting information change process. As is understood from the above description, in the present embodiment, when the change of one of corresponding setting information is failed (S145: NO), the CPU 210 proceeds to the processing on the subsequent pair after the error information is stored. In a modification, however, the setting information change process may be ended after the error information is stored.

The output file in the setting information change process is only the status file which is stored in the USB memory 300 in S70 of FIG. 4. FIG. 6A shows a status file SFa generated when the change of the corresponding setting information is successful for all the pairs to be processed in the setting information change process. The status file SFa is a text file including text (in the example of FIG. 6A, "normal_completion") which indicates that the change of the corresponding setting information is successful, as information indicating the result of the setting information change process. The file name of the status file SFa is determined so as to include a character string of "OK", an arbitrary character string, the model name of the MFP 200A, the serial number of the MFP 200A, a sequential number, and a filename extension ".txt". In the file name, the "OK", the arbitrary character string, the model name, the serial number, and the sequential number are arranged in this order through under bars "_".

The "OK" is a character string which indicates that the change of the corresponding setting information is successful. With this character string, the user can easily recognize that the change of the corresponding setting information is successful without checking the information within the status file SFa.

The arbitrary character string (in the example of FIG. 6A, the "SAMPLE") is an arbitrary character string which is included in the file name of the change input file IFS (FIG. 2A) used in the setting information change process. As described above, the arbitrary character string is included in the file name, and thus the user can easily recognize a correspondence relationship between the change input file IFS and the status file SFa.

In the file name, the model name of the MFP 200A (in the example of FIG. 6A, "MODEL100" and the serial number of the MFP 200A (in the example of FIG. 6A, "NO12345") are included, and thus the user can easily recognize for which MFP the status file SFa is used. Since the file name includes the sequential number, when the setting related process is performed a plurality of times with the same MFP and a plurality of status files SFa is generated, the status files SFa can be appropriately distinguished.

FIG. 6B shows a status file SFb generated when the change of the corresponding setting information is failed for all or part of the pairs to be processed in the setting information change process. The status file SFb is a text file including text (in the example of FIG. 6B, "JSON_Value_ABNORMAL") which indicates that all or part of the change of the corresponding setting information is failed, as information indicating the result of the setting information change process. The "JSON_Value_ABNORMAL" indicates the occurrence of an abnormality in the specified setting information described previously. In addition to the abnormality in the specified setting information and the abnormality in the setting item name described previously, for example, there are cases of a failure in the decryption process in S115, a failure on the decompression process in S125, a case where the format of the description of the change input file IFS is erroneous and so on. In this case, the setting information change process is interrupted, and all the change of the corresponding setting information is ended unsuccessfully. In this case, although the details thereof will be omitted, a text indicating the cause of the interruption of the setting information change process is included in the status file SFb.

The file name of the status file SFb includes a character string of "NG", an arbitrary character string, the model name of the MFP 200A, the serial number of the MFP 200A, a sequential number, and a filename extension ".txt". The "NG" is a character string which indicates that the change of the corresponding setting information is failed. With this character string, the user can easily recognize that the change of the corresponding setting information is failed without checking the information within the status file SFb. The arbitrary character string, the model name of the MFP 200A, the serial number of the MFP 200A and the sequential number are the same as those in the status file SFa of FIG. 6A.

A-5. Setting Information Acquisition Process

Figure 7:
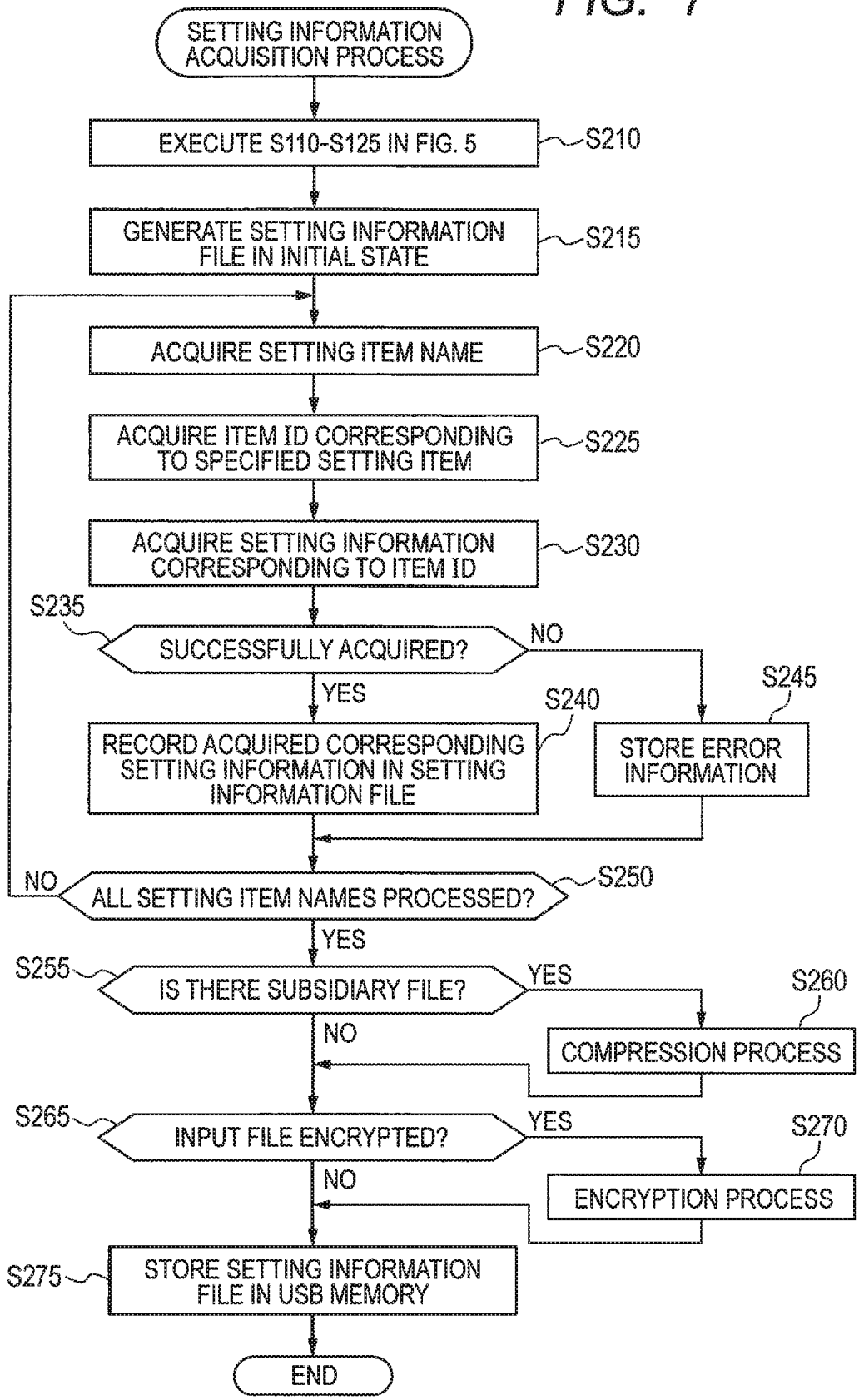
FIG. 7 is a flowchart of a setting information acquisition process in S65 of FIG. 4.

FIG. 7 shows the setting information acquisition process in S65 of FIG. 4. When the setting information acquisition process is performed, the processing file is found to be the acquisition input file IFG. The setting information acquisition process includes: acquiring the corresponding setting information corresponding to the specified setting item specified by the acquisition input information included in the acquisition input file IFG, among a plurality of setting information stored in the setting information database SD;

and storing the setting information file including the corresponding setting information in the USB memory 300 as the output file.

In S210, the CPU 210 performs the steps S110 to S125 of FIG. 5. Due to this, when the acquisition input file IFG is encrypted, the decryption process is performed. When the acquisition input file IFG is compressed, the decompression process is performed, with the result that, for example, the acquisition input file IFG of the JSON format shown in FIG. 3 is acquired.

In S215, the CPU 210 generates the setting information file in an initial state on the volatile memory 220. The corresponding setting information is recorded in the setting information file in the initial state as will be described later, and thus the setting information file is generated as the output file. As shown in FIGS. 8A and 8B, the output file in the setting information acquisition process includes a status file (FIG. 8B) generated in S70 of FIG. 4 and a setting information file SIF (FIG. 8A). The setting information file SIF includes at least one main setting information file MIF (FIG. 8A (A1)). The setting information file in the initial state generated in S215 is the main setting information file MIF in the initial state. The setting information file SIF may include one main setting information file MIF as well as one or more subsidiary files, and this will be described later.

The file name of the setting information file SIF (that is, the file name of the main setting information file MIF) is determined so as to include an arbitrary character string, the model name of the MFP 200A, the serial number of the MFP 200A, a sequential number, and a filename extension ".json". In the file name, the arbitrary character string, the model name, the serial number and the sequential number are arranged in this order through under bars "_". The arbitrary character string (in the example of FIG. 8A (A1), the "SAMPLE") is an arbitrary character string (FIG. 3) which is included in the acquisition input file IFG used in the setting information change process. The model name of the MFP 200A (in the example of FIG. 8A (A1), "MODEL100"), the serial number of the MFP 200A (in the example of FIG. 8A (A1), "NO12345"), and the sequential number (in the example of FIG. 8A (A1), "002") are as described previously.

In S220, the CPU 210 acquires the setting item names one at a time from the acquisition input information included in the acquisition input file IFG (FIG. 3). In the example of FIG. 3, for example, the "display_language" serving as the setting item name is first acquired, and the "logo_image" is acquired in the third time.

In S225, as in S135 of FIG. 5, the CPU 210 acquires an item ID corresponding to the specified setting item specified by the acquired setting item name.

In S230, the CPU 210 acquires, from the setting information database SD, the setting information corresponding to the acquired item ID, that is, the corresponding setting information corresponding to the setting item indicated by the setting item name acquired in S220.

In S235, the CPU 210 determines whether the acquisition of the corresponding setting information is successful. Here, a cause of a failure in the acquisition of the corresponding setting information includes an abnormality in the setting item name. The abnormality in the setting item name is a case where since the description of the setting item name is erroneous, the corresponding item ID cannot be acquired in S225.

When the acquisition of the corresponding setting information is failed (S235: NO), in S245, the CPU 210 stores, in the volatile memory 220, error information indicating the cause of the error. The stored error information is recorded in the status file generated in S70 of FIG. 4 described previously. When the acquisition of the corresponding setting information is successful (S235: YES), in S240, the CPU 210 records the corresponding setting information acquired in S230 in association with the setting item name acquired in S220, in the setting information file SIF. Specifically, a pair of the setting item name acquired in S220 and the corresponding setting information acquired in S230 is recorded in the setting information file SIF.

For example, when the setting item name acquired in S220 is the "display_language" and the corresponding setting information acquired in S230 is "Japanese", a pair in which the "display_language" and the "Japanese" are associated with each other through a colon ":" is recorded in the main setting information file MIF (FIG. 8A (A1)). When the setting item name acquired in S220 is the "logo_image" and the corresponding setting information acquired in S230 is an image file which includes a file name "logo2.png", a pair in which the "display_language" and the file name "logo2.png" are associated with each other through a colon ":" is recorded in the main setting information file MIF (FIG. 8A (A1)). Further, the image file which includes the file name "logo2.png" is stored as a subsidiary file in the volatile memory 220. In FIG. 8A (A2), a logo image LIb represented by the image file is illustrated.

In S250, the CPU 210 determines whether all the setting item names included in the acquisition input file IFG are processed. When an unprocessed setting item name is present (S250: NO), the CPU 210 returns to S220. When all the setting item names are processed (S250: YES), the CPU 210 moves the processing to S255.

In S255, the CPU 210 determines whether the setting information file SIF generated on the volatile memory 220 includes a subsidiary file. In other words, it is determined whether the setting information file SIF includes a plurality of files. When a subsidiary file is included in the setting information file SIF (S255: YES), in S260, the CPU 210 compresses, according to a known compression algorithm, the main setting information file MIF and one or more subsidiary files so as to generate one compressed setting information file SIF. The setting information file SIF is, for example, a file which corresponds to a ZIP file format. When no subsidiary file is included in the setting information file SIF (S255: NO), the compression process in S260 is skipped.

In S265, the CPU 210 determines whether the acquisition input file IFG used in the setting information acquisition process is encrypted. When the acquisition input file IFG is encrypted, the CPU 210 easily determines that the acquisition input file IFG is encrypted since the decryption process has been performed in S210. When the acquisition input file IFG is encrypted (S265: YES), in S270, the CPU 210 performs an encryption process in which the setting information file SIF (one main setting information file MIF or one compressed setting information file SIF) is encrypted according to a known common key encryption method. In this way, one encrypted setting information file SIF is generated. As the common key, the same common key as used for encrypting the acquisition input file IFG in the terminal apparatus 100 is used. When the acquisition input file IFG is not encrypted (S265: NO), the encryption process in S270 is skipped.

In S275, the generated setting information file SIF is stored in the USB memory 300 connected to the communication interface 270, and the setting information acquisition process ends.

The output file in the setting information acquisition process will be described. The output file in the setting information acquisition process includes the setting information file SIF which is stored in the USB memory 300 in S275 of FIG. 7 and the status file which is generated in S70 of FIG. 4.

As described previously, the setting information file SIF includes one or more pairs of the setting item name and the corresponding setting information. The one or more pairs included in the setting information file SIF correspond to one or more setting item names included in the acquisition input file IFG used in the setting information acquisition process. For example, the setting information file SIF of FIG. 8A is generated when the acquisition input file IFG of FIG. 3 is used. The acquisition input file IFG of FIG. 3 includes three setting item names of the "display_language", the "sleep_transition_time" and the "logo_image". Hence, the setting information file SIF of FIG. 8A includes pairs corresponding to the three setting item names, specifically, a pair of the "display_language" and the "Japanese", a pair of the "sleep_transition_time" and the "20", and a pair of the "logo_image" and the image file including the file name "logo2.png". Consequently, the user describes the desired setting item name in the acquisition input file IFG, and thereby can easily acquire the setting information file SIF including the setting information corresponding to the desired setting item.

The status file which is generated in S70 of FIG. 4 as the output file in the setting information acquisition process is the same as the status file (FIGS. 6A and 6B) serving as the output file in the setting information change process. For example, FIG. 8B shows a status file SFc generated when the acquisition of the corresponding setting information is successful for all the setting item names to be processed in the setting information acquisition process. As with the status file SFa of FIG. 6A, the file name of the status file SFc is determined so as to include the "OK", the arbitrary character string, the model name, the serial number, the sequential number, and the filename extension ".txt". The status file SFc is a text file including text (in the example of FIG. 8B, "normal_completion") which indicates that the acquisition of the corresponding setting information is successful. Although not shown in the figure, a status file generated when the acquisition of the corresponding setting information is failed for all or part of the setting item names to be processed in the setting information acquisition process is the same as the status file SFb of FIG. 6B. In other words, the status file when the acquisition of the corresponding setting information is failed is a text file which includes the file name including the "NG", the arbitrary character string, the model name, the serial number, the sequential number, and the filename extension ".txt" and which includes the text indicating the cause of the failure.

As is understood from the above description, in the present embodiment, the change input information included in the change input file IFS (FIGS. 2A and 2B) and the output information included in the setting information file SIF (FIG. 8A) which is the output file in the setting information acquisition process are information in which the pair of the setting item name and the setting information is described according to the same file format (in the present embodiment, the JSON). Consequently, for example, when the file name of the setting information file SIF obtained by the setting information acquisition process is changed to a file name which includes the character string of the "SETTING", the setting information file SIF can be used as the change input file IFS for the setting information change process. An example thereof will be described.

FIG. 9 shows steps for copying setting information in the MFP 200A to the MFP 200B. When the setting information on the MFP 200A is copied to the MFP 200B, in S310, the user uses the terminal apparatus 100 to generate the acquisition input file IFG, and stores the acquisition input file IFG in the USB memory 300. In the acquisition input file IFG, the setting item name corresponding to the setting information to be copied to the MFP 200B is described. The file name of the acquisition input file IFG is set to, for example, "ACQUISITION_FOR-COPY_COMPREHENSIVE-SETTING.json".

In S320, the user connects the USB memory 300 in which the acquisition input file IFG is stored to the communication interface 270 of the MFP 200A. In this way, the setting related process of FIG. 4 is performed by the CPU 210 in the MFP 200A, and thus the setting information file SIF including the setting information to be copied to the MFP 200B is stored in the USB memory 300. Consequently, the user can acquire the setting information to be copied to the MFP 200B. The file name of the setting information file SIF is, for example, "FOR-COPY_MODEL100_NO12345_001.json".

In S330, the user uses the terminal apparatus 100 to change the file name of the setting information file SIF acquired in S320 to the file name of the change input file IFS. For example, the file name of the setting information file SIF is changed from the "FOR-COPY_MODEL100_NO12345_001.json" described above to "SETTING_FOR-COPY_COMPREHENSIVE-SETTING.json". The setting information file SIF whose file name is changed is stored in the USB memory 300.

In S340, the USB memory 300 in which the setting information file SIF whose file name is stored is connected to the communication interface 270 of the MFP 200B. In this way, the setting related process of FIG. 4 is performed by the CPU 210 of the MFP 200B. In the setting related process, the setting information file SIF whose file name has been changed is used as the change input file IFS. Consequently, the specific setting information included in the setting information database SD of the MFP 200B is changed to the setting information included in the setting information file SIF.

By the processing described above, the setting information on the MFP 200A can easily be copied to the MFP 200B. Hence, for example, setting information in one MFP can also easily be copied to a large number of other MFPs. Moreover, for example, the current setting information on the MFP 200A is acquired as the setting information file SIF, and in the future, the setting information can easily be restored on the MFP 200A.

Further, in the setting related process (FIG. 4) of the above-described embodiment, in S40, S50 and S55, it is determined which one of the setting information change process (S60) and the setting information acquisition process (S65) is to be performed, based on the file name of the input file. Then, when the input file is encrypted, the decryption process is performed (S115 of FIG. 5 and S210 of FIG. 7). Consequently, when the input file is encrypted, the change and acquisition of the setting information can be appropriately performed. For example, it is assumed that the decryption process is performed on the input file before it is determined which one of the setting information change process (S60) and the setting information acquisition process (S65) is to be performed. In this case, when the file name of the input file is erroneous or when a file other than the input file is selected as the processing file, it is highly likely that the decryption process is wasted or that an appropriate decryption process cannot be performed. In the present embodiment, such inconvenience can be suppressed.

Further, in the setting related process (FIG. 4) of the above-described embodiment, when the input file is compressed, the decompression process is performed after it is determined in S40, S50, S55 which one of the setting information change process (S60) and the setting information acquisition process (S65) is to be performed (S125 of FIG. 5, S210 of FIG. 7). Consequently, when the input file is compressed, the change and acquisition of the setting information can be appropriately performed. For example, the problem that the decompression process is wasted and the problem that an appropriate decompression process cannot be performed can be suppressed.

Further, in the setting related process of the above-described embodiment, when the setting information change process is performed, the status files SFa and SFb (FIG. 6) including information indicating the results of the setting information change process are stored as the output files in the USB memory 300 (S70 of FIG. 4). When the setting information acquisition process is performed, the status file SFc (FIG. 8B) including information indicting the results of the setting information acquisition process and so on are stored as the output files in the USB memory 300 (S70 of FIG. 4). Consequently, the results of the processes described above can be appropriately outputted by using the USB memory 300. Hence, convenience on the settings of the MFP is further enhanced.

Further, in the setting related process of the above-described embodiment, the file names of the output files such as the status files SFa to SFc and the setting information file SIF are arbitrary character strings which are different from the "SETTING" and the "ACQUISITION", and include arbitrary character strings (for example, the "SAMPLE") included in the change input file IFS and the acquisition input file IFG. Consequently, the output file including the file name that is easy to understand the correspondence relationship with the input file can be stored in the USB memory 300. Hence, convenience on the settings of the MFP is further enhanced.

The "SETTING" in the file names (FIG. 2A) of the input files of the present embodiment is an example of the first character string, the "ACQUISITION" (FIG. 3) is an example of the second character string, the "COMPREHENSIVE-SETTING" is an example of the third character string, and the "SAMPLE" is an example of the fourth character string. The printing process in S45 of FIG. 4 is an example of the specific image processing.

B. Modifications

While the disclosure has been described in detail with reference to the above aspects thereof, it would be apparent to those skilled in the art that various changes and modifications may be made therein without departing from the scope of the claims.

(1) FIG. 10 shows a setting information change process according to a modification. In this modification, in S410, S110 to S155 of FIG. 5, that is, the entire setting information change process of the embodiment is performed. In S420, the CPU 210 determines whether setting information corresponding to at least one setting item is changed in S410. When the setting information corresponding to at least one setting items is changed (S420: YES), the CPU 210 moves the processing to S430. When no setting information is changed (S420: NO), the CPU 210 skips the processing in S430 and ends the setting information change process. For example, when the processing in S410 ends due to an error in the decompression process of the change input file IFS and so on without changing any one of setting information, the process in S430 is skipped.

In S430, the processes in S215 to S275 of FIG. 7 are performed. Here, the setting item names forming one or more pairs described in the change input file IFS are selected one by one. In this way, in S410, one or more setting information which has been changed is acquired from the setting information database SD. In other words, the setting information corresponding to the setting item specified by the change input information included in the change input file IFS is acquired from the setting information database SD. Then, the setting information file SIF including the acquired setting information is stored as the output file in the USB memory 300.

Consequently, in S410, with respect to the setting information which has been successfully changed, the changed setting information is included in the setting information file SIF. In S410, with respect to the setting information for which change is failed, the unchanged setting information is included in the setting information file SIF. Hence, the user checks the setting information file SIF and thereby can easily check whether the desired setting information is appropriately changed.

The determination in S420 may be omitted, and S430 may be always performed after S410.

(2) The format of the description of the change input information included in the change input file IFS of the above-described embodiment is an example, and various modifications are possible. For example, in the JSON format, for example, the details of the indent, the line break, the order in which the items are arranged and so on may be different. For example, the change main input file MFS of FIG. 2A may be described without the line break such that {"display_language": "English", "sleep_transition_time": 30, "logo_image": "logo1.png", "shortcut_setting": "shortcut.xml"}. The same is true for the format of the description of the acquisition input information included in the acquisition input file IFG of FIG. 3 and the format of the description of the output information included in the output files (the status files SFa to SFc and the main setting information file MIF) of FIGS. 6A, 6B, 8A, and 8B. Even if the change input file IFS and the main setting information file MIF differ from each other in the format of the details, when it is described with the same JSON, it can be said that they have the same file format.

Further, the format of the description of information included in the input file and the output file is not limited to the JSON format. The format of the description of the information may be the XML format or the HTML format. The format may be a unique format which is determined by the manufacture of the MFPs 200A to 200C. The input file and the output file may have different formats.

(3) The format of the description of the acquisition input information included in the acquisition input file IFG of the above-described embodiment is also an example, and various modifications are possible. For example, when "main setting" is specified as the setting item name in the acquisition input information, even if the setting item name for each of setting information is not specified, the setting information corresponding to all the setting items including the "display_language", the "sleep_transition_time", the "logo_image", and the "shortcut_setting" may be acquired.

(4) In the change input information and the acquisition input information, the setting item names are used as the information for specifying the setting items. Instead of this, the item IDs may be used as the information for specifying the setting items.

(5) The file names of the input file and the output file of the above-described embodiment are one example, and the file names are not limited to this. For example, the file name of the input file may not include the "COMPREHENSIVE-SETTING". In this case, for example, when the file name includes the "SETTING", the setting information change process may be performed. When the file name includes the "ACQUISITION", the setting information acquisition process may be performed. When the file name includes neither the "SETTING" nor the "ACQUISITION", the printing process may be performed. Alternatively, instead of determination based on the character string of the "COMPREHENSIVE-SETTING", it may be determined which process needs to be performed, based on the filename extension of the file name. Specifically, in S40 of FIG. 4, the CPU 210 determines whether the filename extension of the file name is the ".json". Then, when the filename extension of the file name is the ".json" (S40: YES) and the file name begins with the "SETTING" (S50: YES), the setting information change process is performed (S60). When the filename extension of the file name is the ".json" (S40: YES) and the file name begins with the "ACQUISITION" (S55: YES), the setting information acquisition process is performed (S65). When the filename extension of the file name is not the ".json" (S40: NO), the printing process is performed (S45).

For example, the file names of the input file and the output file may not include an arbitrary character string such as the "SAMPLE".

The combination of the character strings used in the file name of the input file, that is, the combination of the "SETTING" and the "ACQUISITION" is an example. For example, another combination of "WRITING" and "READING" may be used.

The file names of the status files SFa to SFc may not include the "NG" and the "OK". The file names of the status files SFa to SFc and the setting information file SIF may not include the whole or part of the model name, the serial number, and the sequential number. The file names of the output files thereof may include other character strings such as a character string indicating the date and time when the setting related process is performed.

(6) The detailed processing of the setting related process (FIGS. 4, 5 and 7) of the above-described embodiment is an example, and may be changed as necessary. For example, when the encryption and the compression of the input file are not performed, the processing in S110 to S125 of FIG. 5 may be omitted. The decryption process and the decompression process on the input file may be performed immediately after the detection of the connection of the USB memory 300. Immediately after the detection of the connection of the USB memory 300, the file selection screen may be always displayed, and the processing file may be selected based on an instruction from the user. The step of storing the status file in the USB memory 300 (S70 of FIG. 4) may be omitted and, instead of this, the result of the processing may be displayed on the display 240.

(7) In the above-described embodiment, the MFPs 200A to 200C are adopted as the electronic apparatus. However, an image processing apparatus such as a scanner, a printer, or a digital camera may be adopted as the electronic apparatus. Instead of the image processing apparatus, another type of electronic apparatus such as a music player, a storage device, or a communication device such as a router may be adopted as the electronic apparatus.

In S45 of FIG. 4, the printing process using the input file is performed. However, another type of process may be performed according to the adopted electronic apparatus. For example, when a DVD player or the like is adopted, a process for playing a movie image using the input file may be performed.

(8) Instead of the USB memory 300 used in the above-described embodiment, another removable memory may be used. For example, a memory card such as an SD card or a smart media, an optical disc such as a DVD-ROM or a magnetic disc may be used.

(9) In each of the above-described embodiments, a part of configurations realized by hardware may be replaced with software, and conversely, a part or entirety of configurations realized by software may be replaced with hardware.

(10) When a part or entirety of the functions of this disclosure is realized by a computer program, the program may be provided in a form stored in a computer-readable storage medium (for example, a non-transitory storage medium). The program may be used in a state where the program is stored in the same or different storage medium (computer-readable storage medium) from the storage medium by which the program is provided. The "computer-readable storage medium" may include a portable storage medium such as a memory card and a CD-ROM, an internal memory such as various ROM, and an external storage device, such as a hard disk drive, connected to the computer.

What is claimed is:

1. An image processing apparatus including a printer or a scanner, comprising:
   an interface configured to be connected to a removable memory;
   a processor; and
   an internal memory storing a plurality of setting information corresponding to a plurality of setting items on the image processing apparatus, the plurality of setting information being used for performing image processing by the printer or the scanner, the internal memory storing instructions, the instructions, when executed by the processor, causing the processor to perform:
      acquiring an input file name of an input file stored in the removable memory connected to the interface, the input file including a change input file or an acquisition input file, the change input file being used in a change process for change of the plurality of setting information stored in the internal memory, and the acquisition input file being used in an acquisition process for acquisition of the plurality of setting information stored in the internal memory;
      determining whether the input file name includes a first character string corresponding to the change input file and whether the input file name includes a second character string corresponding to the acquisition input file, the first character string being different from the second character string, the first character string indicating the change process, and the second character string indicating the acquisition process; and
      performing either one of the change process or the acquisition process depending on the input file name;
   the change process comprising, in response to determining that the input file name includes the first character string, changing current setting information into specified setting information, the current setting information being among the plurality of setting information stored in the internal memory and corresponding to a first setting item specified by first input information included in the input file, the specified setting information being included in the first input information stored in the removable memory and corresponding to the first setting item; and the acquisition process comprising, in response to determining that the input file name includes the second character string:
acquiring, from the internal memory, current setting information corresponding to a second setting item specified by second input information included in the acquisition input file;
determining whether the acquisition input file is encrypted;
in response to determining that the acquisition input file is encrypted, performing an encryption process of encrypting output information indicative of the acquired current setting information; and
storing, in the removable memory, a file including the output information indicative of the acquired current setting information corresponding to the second setting item specified by the second input information included in the acquisition input file, as an output file.

2. The image processing apparatus according to claim 1, wherein the first input information describes at least one pair of the first setting item and the specified setting information in accordance with a particular file format, the output information describes at least one pair of the second setting item and the current setting information in accordance with the same particular file format as the first input information.

3. The image processing apparatus according to claim 1, wherein the instructions, when executed by the processor, cause the processor to perform:
determining whether the input file name includes a third character string;
in response to determining that the input file name includes the third character string, determining whether the input file name includes the first character string and whether the input file name includes the second character string;
in response to determining that the input file name includes the third character string and the first character string, changing the current setting information to the specified setting information;
in response to determining that the input file name includes the third character string and the second character string,
acquiring the current setting information; and
storing, in the removable memory, the output file including the output information indicative of the current setting information; and
wherein the image processing apparatus further comprises an image processor configured to perform particular image processing by using the input file when the input file name does not include the third character string.

4. The image processing apparatus according to claim 1, wherein the instructions, when executed by the processor, cause the processor to perform:
determining whether the input file is encrypted;
when the input file is encrypted, decrypting the encrypted input file after determining whether to change the current setting information or to acquire the current setting information based on a determination result of determining the input file name;
in response to determining that the input file name includes the first character string, changing the current setting information into the specified setting information by using the decrypted input file; and
in response to determining that the input file name includes the second character string, acquiring the current setting information by using the decrypted input file.

5. The image processing apparatus according to claim 1, wherein the instructions, when executed by the processor, cause the processor to perform:
determining whether the input file is compressed;
when the input file is compressed, decompressing the compressed input file after determining whether to change the current setting information or to acquire the current setting information based on a determination result of determining the input file name;
in response to determining that the input file name includes the first character string, changing the current setting information into the specified setting information by using the decompressed input file; and
in response to determining that the input file name includes the second character string, acquiring the current setting information by using the decompressed input file.

6. The image processing apparatus according to claim 1, wherein the instructions, when executed by the processor, cause the processor to perform:
in response to determining that the input file name includes the first character string, storing, in the removable memory, a file including information indicative of a result of changing the current setting information, as the output file; and
in response to determining that the input file name includes the second character string, storing, in the removable memory, a file including information indicative of a result of acquiring the current setting information, as the output file.

7. The image processing apparatus according to claim 1, wherein a file name of the output file includes a fourth character string included in the input file name, the fourth character string being different from the first character string and the second character string.

8. The image processing apparatus according to claim 1, wherein the instructions, when executed by the processor, cause the processor to perform:
detecting connection of the removable memory to the interface; and
in response to detecting connection of the removable memory,
acquiring the input file name without receiving a user operation; and
determining whether the input file name includes the first character string and whether the input file name includes the second character string, without receiving a user operation.

9. The image processing apparatus according to claim 1, wherein the instructions, when executed by the processor, cause the processor to perform:
in response to determining that the input file name includes the first character string,
changing the current setting information;
after changing the current setting information, acquiring the changed current setting information corresponding to the first setting item; and
storing, in the removable memory, a file including information indicative of the changed current setting information, as the output file.

10. The image processing apparatus according to claim 1, wherein the change input file and the acquisition input file have a same file format; and
   wherein the current setting information changed in the change process and the current setting information acquired in the acquisition process include information of a same type.

11. The image processing apparatus according to claim 1, wherein the acquisition process further comprises:
   acquiring the second setting item from the second input information included in the acquisition input file;
   acquiring an item ID corresponding to the acquired second setting item;
   acquiring, from a setting information database in the internal memory, the current setting information corresponding to the acquired item ID; and
   storing, in a setting information file in the removable memory, the acquired current setting information in association with the acquired second setting item.

12. The image processing apparatus according to claim 1, wherein the change process further comprises:
   acquiring, from the change input file, a pair of the first setting item and the specified setting information;
   acquiring an item ID corresponding to the first setting item included in the acquired pair by referring to a setting information correspondence table in the internal memory; and
   changing the current setting information corresponding to the acquired item ID into the specified setting information included in the acquired pair.

13. A non-transitory computer-readable storage medium storing a set of program instructions executable on an image processing apparatus including a printer or a scanner, the set of program instructions comprising:
   acquiring an input file name of an input file stored in a removable memory connected to an interface of the image processing apparatus, the image processing apparatus having an internal memory storing a plurality of setting information corresponding to a plurality of setting items on the image processing apparatus, the plurality of setting information being used for performing image processing by the printer or the scanner, the input file including a change input file or an acquisition input file, the change input file being used in a change process for change of the plurality of setting information stored in the internal memory, and the acquisition input file being used in an acquisition process for acquisition of the plurality of setting information stored in the internal memory;
   determining whether the input file name includes a first character string corresponding to the change input file and whether the input file name includes a second character string corresponding to the acquisition input file, the first character string being different from the second character string, the first character string indicating the change process, and the second character string indicating the acquisition process; and
   performing either one of the change process or the acquisition process depending on the input file name;
   the change process comprising, in response to determining that the input file name includes the first character string, changing current setting information into specified setting information, the current setting information being among the plurality of setting information stored in the internal memory and corresponding to a first setting item specified by first input information included in the input file, the specified setting information being included in the first input information stored in the removable memory and corresponding to the first setting item; and
   the acquisition process comprising, in response to determining that the input file name includes the second character string,
     acquiring, from the internal memory, current setting information corresponding to a second setting item specified by the second input information included in the acquisition input file;
     determining whether the acquisition input file is encrypted;
     in response to determining that the acquisition input file is encrypted, performing an encryption process of encrypting output information indicative of the acquired current setting information; and
     storing, in the removable memory, a file including the output information indicative of the acquired current setting information corresponding to the second setting item specified by the second input information included in the acquisition input file, as an output file.

14. The non-transitory computer-readable storage medium according to claim 13, wherein the first input information describes at least one pair of the first setting item and the specified setting information in accordance with a particular file format, and the output information describes at least one pair of the second setting item and the current setting information in accordance with the same particular file format as the first input information.

15. The non-transitory computer-readable storage medium according to claim 13, wherein the set of program instructions comprises:
   determining whether the input file name includes a third character string;
   in response to determining that the input file name includes the third character string, determining whether the input file name includes the first character string and whether the input file name includes the second character string;
   in response to determining that the input file name includes the third character string and the first character string, changing the current setting information to the specified setting information;
   in response to determining that the input file name includes the third character string and the second character string,
     acquiring the current setting information; and
     storing, in the removable memory, the output file including the output information indicative of the current setting information; and
   wherein the image processing apparatus further comprises an image processor configured to perform particular image processing by using the input file when the input file name does not include the third character string.

16. The non-transitory computer-readable storage medium according to claim 13, wherein the set of program instructions comprises:
   determining whether the input file is encrypted;
   when the input file is encrypted, decrypting the encrypted input file after determining whether to change the current setting information or to acquire the current setting information based on a determination result of determining the input file name;
   in response to determining that the input file name includes the first character string, changing the current setting information into the specified setting information by using the decrypted input file; and in response to determining that the input file name includes the second character string, acquiring the current setting information by using the decrypted input file.

17. The non-transitory computer-readable storage medium according to claim 13, wherein the set of program instructions comprises:

determining whether the input file is compressed;

when the input file is compressed, decompressing the compressed input file after determining whether to change the current setting information or to acquire the current setting information based on a determination result of determining the input file name;

in response to determining that the input file name includes the first character string, changing the current setting information into the specified setting information by using the decompressed input file; and in response to determining that the input file name includes the second character string, acquiring the current setting information by using the decompressed input file.

18. The non-transitory computer-readable storage medium according to claim 13, wherein the set of program instructions comprises:

in response to determining that the input file name includes the first character string, storing, in the removable memory, a file including information indicative of a result of changing the current setting information, as the output file; and in response to determining that the input file name includes the second character string, storing, in the removable memory, a file including information indicative of a result of acquiring the current setting information, as the output file.

19. The non-transitory computer-readable storage medium according to claim 13, wherein a file name of the output file includes a fourth character string included in the input file name, the fourth character string being different from the first character string and the second character string.

20. The non-transitory computer-readable storage medium according to claim 13, wherein the set of program instructions comprises:

detecting connection of the removable memory to the interface; and in response to detecting connection of the removable memory, acquiring the input file name without receiving a user operation; and determining whether the input file name includes the first character string and whether the input file name includes the second character string, without receiving a user operation.

21. The non-transitory computer-readable storage medium according to claim 13, wherein the set of program instructions comprises:

in response to determining that the input file name includes the first character string, changing the current setting information;

after changing the current setting information, acquiring the changed current setting information corresponding to the first setting item; and storing, in the removable memory, a file including information indicative of the changed current setting information, as the output file.

22. A method of performing settings of an image processing apparatus including a printer or a scanner, the method comprising:

acquiring an input file name of an input file stored in a removable memory connected to an interface of the image processing apparatus, the image processing apparatus having an internal memory storing a plurality of setting information corresponding to a plurality of setting items on the image processing apparatus, the plurality of setting information being used for performing image processing by the printer or the scanner, the input file including a change input file or an acquisition input file, the change input file being used in a change process for change of the plurality of setting information stored in the internal memory, and the acquisition input file being used in an acquisition process for acquisition of the plurality of setting information stored in the internal memory;

determining whether the input file name includes a first character string corresponding to the change input file and whether the input file name includes a second character string corresponding to the acquisition input file, the first character string being different from the second character string, the first character string indicating the change process, and the second character string indicating the acquisition process; and performing either one of the change process or the acquisition process depending on the input file name;

the change process comprising, in response to determining that the input file name includes the first character string, changing current setting information into specified setting information, the current setting information being among the plurality of setting information stored in the internal memory and corresponding to a first setting item specified by first input information included in the input file, the specified setting information being included in the first input information stored in the removable memory and corresponding to the first setting item; and the acquisition process comprising, in response to determining that the input file name includes the second character string, acquiring, from the internal memory, current setting information corresponding to a second setting item specified by second input information included in the acquisition input file;

determining whether the acquisition input file is encrypted;

in response to determining that the acquisition input file is encrypted, performing an encryption process of encrypting output information indicative of the acquired current setting information; and storing, in the removable memory, a file including the output information indicative of the acquired current setting information corresponding to the second setting item specified by the second input information included in the acquisition input file, as an output file.

23. The method according to claim 22, further comprising:

using a terminal apparatus to generate the input file having the input file name including the second character string;

storing the input file in the removable memory;

connecting the removable memory to a first image processing apparatus and acquiring the output file from the first image processing apparatus;

using the terminal apparatus to change a file name of the output file into a file name including the first character string;

storing, in the removable memory, the output file having the file name including the first character string; and connecting the removable memory to a second image processing apparatus and changing current setting information of the second image processing apparatus.

\* \* \* \* \*